United States Patent Office 3,211,256
Patented Oct. 12, 1965

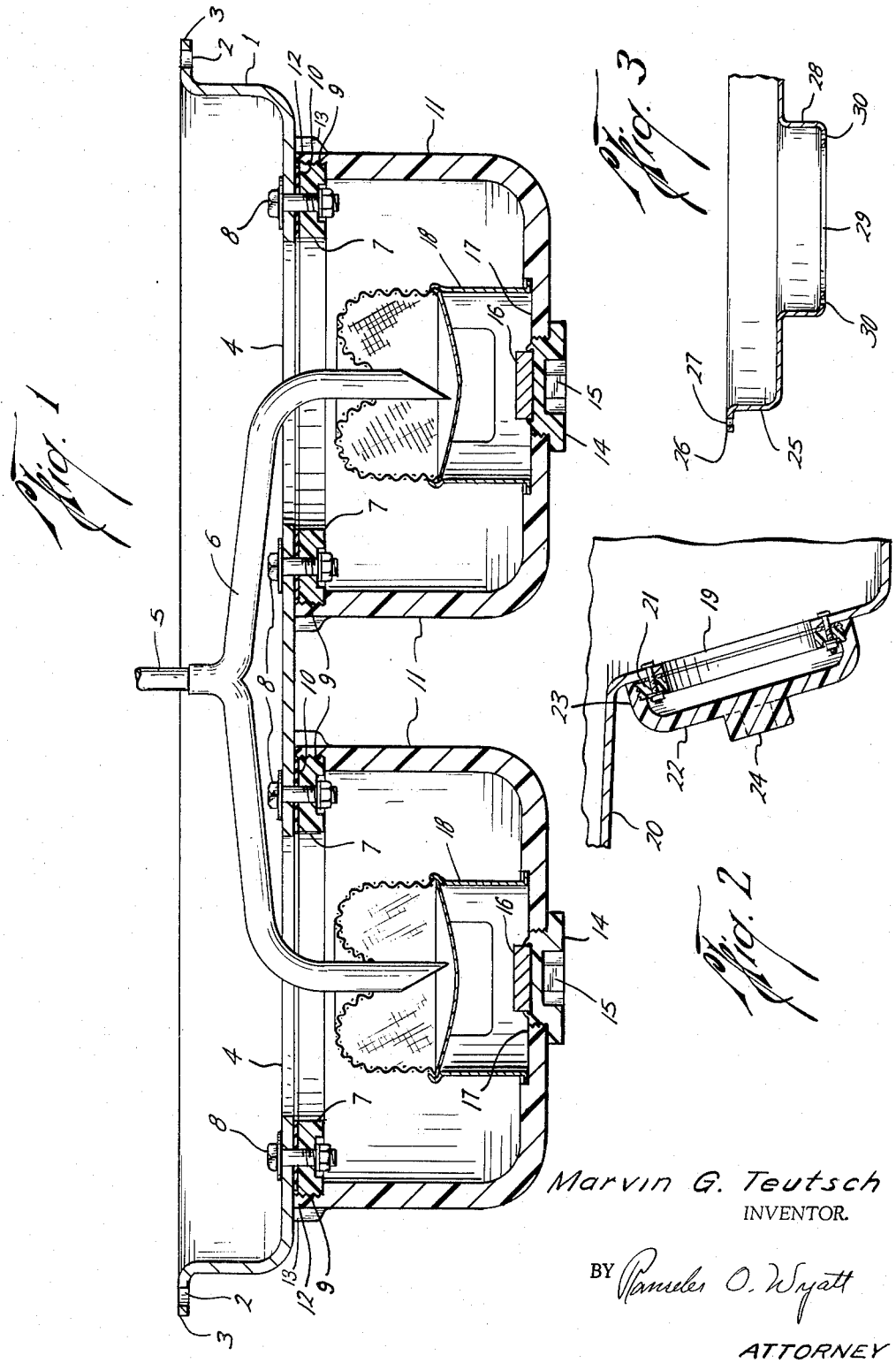

3,211,256
PAN RESERVOIR AND CLOSURE
Marvin G. Teutsch, 3206 Charleston, Houston, Tex.
Filed May 20, 1963, Ser. No. 281,549
2 Claims. (Cl. 184—106)

This application is a continuation-in-part of the application filed by me on a Combination Drain Plug and Screen in the United States Patent Office on Apr. 10, 1963, under Ser. No. 272,131.

This invention relates to new and useful improvements in a Pan Reservoir and Closure.

It is an object of this invention to provide a pan construction for use on combustion engines, such as automobile engines, having novel means for flushing the engine pan.

It is another object of the invention to provide a pan assembly for engines having novel means for oil filtering and providing quick and easy access to the bearings, crank shaft, oil pump and other parts of the engine.

On engines of most automotive vehicles in present use, the pan mounted on the crankcase of the engine receives the oil used in lubrication of the engine after it has been circulated through the engine, and this oil is often very hot, contains carbon picked up in its circulation, becomes burned and particularly after considerable use, forms a sludge in the bottom of the pan which mixes with the oil as it is again picked up by the oil pump and recirculated through the engine. Furthermore, there are many times when minor adjustments are needed, such as to the oil pump, which may be accomplished only by removal of the pan, which is a task requiring removal of the pan bolts, after draining the oil, and then reassembling same, and is not considered a part of the periodical servicing of an automobile. It is an object of this invention to provide means for flushing and thoroughly cleaning the pan and filter each time the oil is changed in the engine as a part of the regular servicing of the vehicle, as well as means for easy and ready access to the parts of the engine ordinarily exposed by removal of the pan.

It is another object of the invention to provide novel closure means adaptable to other parts of an automotive vehicle, providing quick and easy access for cleaning or repair.

With the above and other objects in view, the invention has relation to certain novel features of cotnstruction, operation and arrangement of parts more particularly defined in the following specifications and illustrated in the accompanying drawings, wherein:

FIGURE 1 is a side elevational view, in cross section, of the novel pan construction, illustrating the multiple reservoirs.

FIGURE 2 is a side elevational view, in cross section, of a modification of the invention, illustrating the use of the novel closure on the side wall of a pan, and FIGURE 3 is a fragmentary elevational view of another form of pan construction.

Referring now more particularly to the drawings, the numeral 1 designates an oil pan to be mounted on the bottom of an engine (not shown) in the usual manner. The pan 1 is shallow and is provided with suitable bolt holes 2, 2 around the outwardly projecting margin 3 thereof, by means of which the pan is mounted on the engine. Large openings 4, 4 preferably two in number, are formed in the pan 1 and the usual oil line 5 is provided with the dual fitting 6, the free ends of which extend downwardly through the openings 4, 4.

Annular members 7, 7 are mounted on to the pan 1 by means of the bolts 8, 8 and encircle the openings 4, 4, the members 7 being formed of a suitable plastic material, such as nylon, and being provided with external threads as 9. A suitable gasket 10 is mounted between the supper surface of the members 7 and the pan 1.

Reservoirs 11, 11 forming closures for the opening 4, 4 are formed of a suitable plastic, such as nylon, and have the internal side walls thereof reduced and threaded as at 12 to provide means for mounting said reservoirs on to the members 7. Wrench receiving lugs 13, 13 are provided for aid in rotating the reservoirs 11.

A drain plug as 14 is mounted in the bottom of each reservoir, the plug having the wrench receiving openings 15 and magnet 16. An annular socket 17 is formed on the inside bottom surface of each reservoir 11 to receive the filter screen 18.

In use, the pan 1 is mounted on the engine in the same manner as the pans presently in use, and the fixture 6 connected to the oil conduit 5. The reservoirs 11, 11 will fill with oil from the pan in the same manner as oil is presently received by the pan, and the oil will be drawn through the filters 18 by the oil pump (not shown) in the usual manner. When it is desired to drain the oil, the plugs 14 may be removed and the oil drained from the pan, and the reservoirs 11, 11 quickly and easily rotated to remove same from the members 7, and the screen, reservoirs and pan quickly and easily flushed and thoroughly cleaned. In the event it is desired to make repairs or replacements to the engine parts ordinarily reached by removing the pan, this may be done through the openings 4, 4. The reservoirs are then easily replaced on to the members 7, 7 by rotation, the nylon to nylon connection of the shoulder of the reduced portion 12 of the reservoirs with the members 7 and the flange of the plugs 14, 14 with the flat surface of the reservoirs 11, 11 form tight seals preventing leakage from the reservoirs when filled with oil.

The ability to easily and thoroughly wash the reservoirs, screens and pans each time the oil is changed so that the clean, new oil is deposited in a clean reservoir will greatly increase the efficiency and life of the engine parts.

In the form shown in FIGURE 2, an opening 19 of adequate size is formed in the side wall of a conventional pan 20, and an annular member 21 of suitable plastic, such as nylon, is bolted to the pan 20 encircling said openings 19. The periphery of said member 21 is threaded and a closure 22 is formed of similar plastic, having the reduced and threaded portion 23 is mounted on said member 21. A suitable wrench receiving projection 24 is provided to impart rotation to said closure 22. When this form of the invention is employed, means are provided for quickly and easily flushing and cleaning the pan after each oil change.

In the form shown in FIGURE 3 the pan 25 is formed of pressed metal, shaped to provide the outwardly projecting margin 26, bolt holes 27 and the screen receiving reservoir 28, the reservoir 28 having the opening 29 and marginal bolt holes 30 to receive an annular externally threaded closure receiving member (not shown) as defined above and as shown in FIGURE 2. In this form, the pan and reservoir is formed by a single pressing on to which a closure and screen may be mounted.

While the foregoing are considered preferred forms of the invention, they are by way of illustration only, the broad principle of the invention being defined by the appended claims.

What I claim is:

1. In a pan reservoir and closure for use on engines, a pan having marginal bolt receiving means, a floor in said pan having a plurality of openings therein, annular members mounted on said pan and encircling each of said openings, the periphery of said members being threaded and reservoirs mounted on said members and suspended from said pan, a socket formed in each of said reservoirs to receive a filter and a drain plug on the axis of each of said sockets.

2. In a pan reservoir and closure for use on engines, a pan having marginal bolt receiving means and a flat floor, a plurality of openings in said floor, an annular nylon member mounted on said pan and encircling each of said openings, said members having threaded peripheries, reservoirs mounted on said members and suspended beneath said pan, the inside side walls of said reservoirs being reduced and threaded and forming a shoulder abutting against the said annular member, a socket formed in the inside bottom wall of each of said reservoirs, filter screens mounted in said sockets and drain plugs in said reservoir axially aligned with said filters.

References Cited by the Examiner

UNITED STATES PATENTS

| | | | |
|---|---|---|---|
| 790,277 | 5/05 | Beck | 141—364 X |
| 1,179,453 | 4/16 | Paton | 123—198 X |
| 1,191,741 | 7/16 | Scull | 210—172 |
| 1,228,558 | 6/17 | Huff | 210—168 X |
| 1,394,011 | 10/21 | Hills | 210—460 X |
| 1,534,793 | 4/25 | Lupton | 220—39 |
| 1,621,155 | 3/27 | Davenport | 184—106 |
| 1,705,645 | 3/29 | Pezold | 184—106 |
| 2,372,286 | 3/45 | Mieras | 184—6 |
| 2,678,728 | 5/54 | Spodig | 210—223 |

FOREIGN PATENTS

| | | |
|---|---|---|
| 121,626 | 7/27 | France. |
| 337,779 | 6/21 | Germany. |
| 34,926 | 5/22 | Norway. |

LAVERNE D. GEIGER, *Primary Examiner.*

MILTON KAUFMAN, *Examiner.*